United States Patent

Pinet et al.

[15] 3,641,272

[45] Feb. 8, 1972

[54] TIME DIVISION AUTOMATIC TELEPHONE SWITCHING EQUIPMENT

[72] Inventors: Andre E. Pinet, 22, Rue Emile Le Gac; Raymond P. Gouttebel, 10, Ruedes Freres Lumiere, both of 22 Perros-Guirec, France

[22] Filed: Oct. 6, 1970

[21] Appl. No.: 90,185

Related U.S. Application Data

[63] Continuation-in-part of Ser. No. 701,247, Jan. 29, 1968, abandoned.

[30] Foreign Application Priority Data

Feb. 21, 1967 France....................................95799

[52] U.S. Cl.........................................................179/15 AT

[51] Int. Cl............................................................H04j 3/00

[58] Field of Search......................179/18 FC, 15 AT, 15 AQ

[56] References Cited

UNITED STATES PATENTS

| | | | |
|---|---|---|---|
| 2,957,949 | 10/1960 | James et al | 179/18 FC |
| 3,446,917 | 5/1969 | Inose et al | 179/18 FC |
| 3,461,242 | 8/1969 | Inose et al | 179/18 FC |
| 3,522,381 | 7/1970 | Feder | 179/15 A |

*Primary Examiner*—Kathleen H. Claffy
*Assistant Examiner*—David L. Stewart
*Attorney*—Abraham A. Saffitz

[57] ABSTRACT

Time division, pulse code modulation switching system comprising a plurality of modulation-demodulation units or concentrator units, each including first converter means connected to subscribers for converting analog signals to pulse amplitude modulation signals and ensuring the inverse conversion, a pair of second converter means for converting said pulse amplitude modulation signals to pulse code modulation signals and ensuring the inverse conversion, two pairs of group highways connected to said pair of second converter means and each including a send group highway and a receive group highway, means for selectively connecting together the send group highway of a pair to the receive group highway of the other pair and means for selectively activating during a full time slot the second converter means and the connecting means and during a half time slot and in phase opposition the first converter means of two subscribers to be connected.

2 Claims, 4 Drawing Figures

INVENTORS:
Andre E. PINET and
Raymond P. GOUTTEBEL
By Abraham A. Saffitz
ATTORNEY

INVENTORS:

Andre E. PINET and
Raymond P. GOUTTEBEL

By Abraham A. Saffitz
ATTORNEY

INVENTORS:

Andre E. PINET and
Raymond P. GOUTTEBEL

By Abraham A. Saffitz
ATTORNEY

INVENTORS:
Andre E. PINET and
Raymond P. GOUTTEBEL
By Abraham A. Saffitz
ATTORNEY

TIME DIVISION AUTOMATIC TELEPHONE SWITCHING EQUIPMENT

The present application is a continuation-in-part of our application Ser. No. 701,247 filed Jan. 29, 1968 and now abandoned.

This invention relates to communication systems and more particularly to a telephone switching system operating on a time division multiplex basis and in which the same time slot is assigned to the calling and called lines.

It is known that a time division (TD), pulse code modulation (PCM) switching system comprises a number of modulation-demodulation units (hereinafter called for short "modem units") each serving a particular group of two-wire subscribers lines or four-wire interoffice circuits, which the latter equipment connects to a two-wire send group highway and to a two-wire receive group highway of a switching network comprising as many pairs of two-wire group highways and as many pairs of two-wire intermediate highways as the switching system comprises modem units, and a switchable cross point for each point of intersection between a group highway and an intermediate highway. The speech signals are sampled cyclically and the amplitude of each pulse derived from the sampling is expressed in a binary code, for instance, an eight-element code, and transmitted, in a time channel or slot of the sampling cycle individual to every call, by a brief closure of the connection points which, by way of a pair of intermediate highways, interconnect the group highways of the modem units serving the calling and called lines or interoffice circuits.

In known TD switching facilities the number of subscriber's lines and interoffice trunks connected to a given modem unit is always greater that the number of time slots in the sampling cycle of said lines and trunks. Besides amplifiers are to be inserted in the group highways to overcome transmission and splitting losses and consequently the links between the modem units are four-wire transmission lines. It results that if a call is placed from a calling to a called subscriber connected to the same modem unit, this call cannot be completed through a common idle time slot, since in this case the link connecting in the switching network the two subscribers only comprises the send group highway and the receive group highway, which forms a two-wire transmission line which would have to convey signals in both directions. Also, interconnecting two subscriber's or interoffice circuits connected to the same modem unit requires a shift between the time channels or slots allotted to them and a corresponding storage of the information to be transmitted. Such an arrangement is termed a time slot interchange.

It is a main aim of this invention to increase the operating reliability of time division switching systems and to obviate difficulties in interconnecting lines or circuits connected to a single modem unit without using slot interchange.

According to a feature of the time division switching system of this invention, each modem unit is connected to two pairs of group highways of the switching network.

According to another feature of the invention, the switching system comprises as many pairs of two-wire intermediate highways as the switching system comprises modem units, and at the intersection between a pair of intermediate highways and the two pairs of group highways from and to a modem unit, switchable cross points enable the first intermediate highway to be connected to the send group highway of the first pair and to the receive group highway of the second pair and enable the second intermediate highway to be connected to the receive group highway of the first pair and to the send group highway of the second pair.

According to another feature of the invention, sampling of the speech signals and coding into PCM of the speech signal samples are decoupled. Coding is made in that part of the switching network where the transmission channels are four-wire lines. The PCM signal from subscriber A to subscriber B and the PCM signal from subscriber B to subscriber A fill the same complete slot duration; notwithstanding these signals are decoupled since they are conveyed by separate two-wire channels. Sampling is made in that part of the switching network where the transmission channels are two-wire lines. In order for the samples of the speech signal from subscriber A to subscriber B and the samples of speech signal from subscriber B to subscriber A not to be mixed, these samples respectively fill the first and the second half of the same slot. In brief, decoupling between the two directions of the communication is achieved on a four-wire basis as regards coding and on a time-sharing basis as regard sampling.

This invention will be more clearly understood from the following description and from the accompanying drawings wherein.

Figure 1:
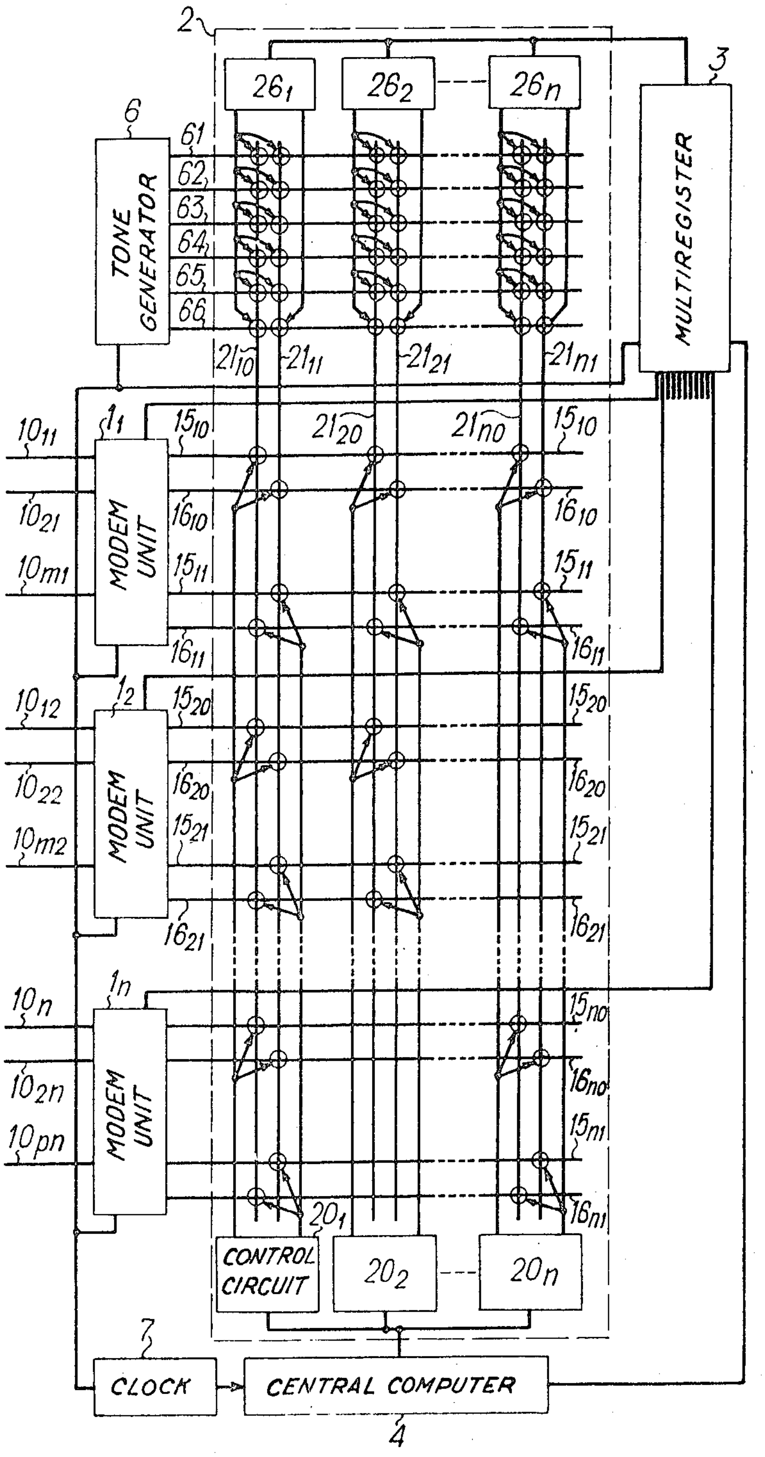
FIG. 1 is a diagrammatic view showing in block diagram form a time division switching system according to the invention.

FIG. 1 is a very diagrammatic view of a TD PCM telephone switching system comprising a multiregister for supervising the time slots of the send and receive highways during the call processing in certain aspects similar to U.S. Pat. No. 3,524,946 issued on Aug. 18, 1970 to André Pinet, Jean-Baptiste Jacob and Ernest Esclangon; but according to the invention, the facility comprises two pairs of group highways per modem unit.

The telephone switching system shown in FIG. 1 comprises a switching network 2 serving a number *n* of modem units $1_1$ to $1_n$ to each of which are connected *m* two-wire subscriber lines or *p* four-wire circuits connected to other switching networks, such lines and circuits having the reference number 10 plus a two-digit subscript $10_{11}$ to $10_{m1}$, $10_{12}$ to $10_{m2}$ . . . $10_{1n}$ to $10_{pn}$, the units digit corresponding to the index of the modem unit $1_1$, $1_2$. . . $1_n$ to which they are connected and the tens digit corresponding to their rank in such modem unit. Each modem unit is connected to one pair of send group highways 15 and one pair of receive group highways 16, these send and receive group highways forming two pairs—a first pair $15_{10}$ and $16_{10}$, $15_{20}$ and $16_{20}$, . . . $15_{n0}$ and $16_{n0}$ of even index and a second odd-index pair $15_{11}$ and $16_{11}$, $15_{21}$ and $16_{21}$. . . $15_{n1}$ and $16_{n1}$.

The total available time in each of the send 15 and receive 16 group highways is divided into a number N of slots. The even-index send group highways $15_{10}$, $15_{20}$. . . $15_{n0}$ can be connected to the odd-index receive group highways $16_{11}$, $16_{21}$. . . $16_{n1}$ by way of *n* even index two-wire intermediate group highways $21_{10}$, $21_{20}$. . . $21_{n0}$ by way of switchable cross points controlled by control circuits $20_1$ to $20_n$. The even-index receive group highways $16_{10}$, $16_{20}$. . . $16_{n0}$ can be connected to the odd-index send group highways $15_{11}$, $15_{21}$. . . $15_{n1}$ through *n* odd-index two-wire intermediate highways $21_{11}$, $21_{21}$. . . $21_{n1}$ by way of switchable cross points controlled by the circuits $20_1$ to $20_n$. The subscriber lines and the interoffice circuits 10 are not simultaneously connected to a single modem unit. For instance, it will be assumed that the modem units $1_1$, $1_2$ serve subscriber lines $10_{11}$ to $10_{m1}$ and $10_{12}$ to $10_{m2}$ and the modem unit $1_n$ serves circuits $10_{1n}$ to $10_{pn}$ connected to other exchanges. The intermediate highways are also divided into two categories—intermediate highways which, like the intermediate highway pairs $21_{10}$, $21_{11}$ and $21_{20}$, $21_{21}$, have switchable cross points with the group highways of all the modem units, as $1_1$, $1_2$, serving subscribers and with just one of the modem units, for instance, the unit $1_n$, serving circuits, and intermediate highways which, like the intermediate highway pair $21_{n0}$, $21_{n1}$, have switchable cross points with the group highways of all the modem units, as $1_n$, which serve interoffice circuits and with just one of the modem units, for instance, the unit $1_1$, serving subscriber lines.

The cross points between each intermediate highway pair $21_{10}$, $21_{11}$ and $21_{20}$, $21_{21}$. . ., $21_{n0}$, $21_{n1}$ and the group highways of the modem units served by such pair are operated by the respective control circuits $20_1$, $20_2$. . . $20_n$. The cross points between the send and receive group highways of any single pair, for instance, $15_{10}$, $16_{10}$, and the intermediate highways of a single pair, e.g., $21_{10}$, $21_{11}$ are controlled simultaneously by the same actuating and release signals.

Every intermediate highway also has switchable crosspoints with tone lines 61–66, each of which receives continuously from a conventional tone generator 6 a PCM version of one of the six tones used—dialing tone, busy tone, ringing tone, transfer tone, national tone and bell signal. The cross points between each intermediate highway pair $21_{10}$, $21_{11}$ to $21_{n0}$, $21_{n1}$ and the tone lines 61–66 are controlled by respective control circuits $26_1$ to $26_n$. Since the tone lines 61–65 are allotted to the first five of the tones just mentioned, such tones being transmitted to subscribers in audible form at a time when only one of the calling and called subscribers is connected, their cross points with the two intermediate highways of a single pair, e.g., $21_{10}$, $21_{11}$, are controlled simultaneously, whereas since the bell signal must be sent only to the called subscriber, the cross points of the bell signal tone line 66 with each of the intermediate highways of a pair are controlled independently.

With this switching network, any two of the subscriber lines or of the interoffice circuits served by the modem units $1_1$ to $1_n$ can be interconnected through the agency of a facility similar to what is disclosed by the aforesaid U.S. Pat. No. 3,524,946, such facility mainly comprising a central computer 4 cooperating with a multiregister 3 and a time base 7 which delivers the time slots and their appropriate subdivisions to the modem units $1_1$ to $1_8$, multiregister 3, tone generator 6 and control circuits $20_1$ to $20_n$.

Free lines are supervised not by a common scanner, as in the aforesaid U.S. patent, but by scanners individual to each modem unit, as will be seen hereinafter.

Figure 2:
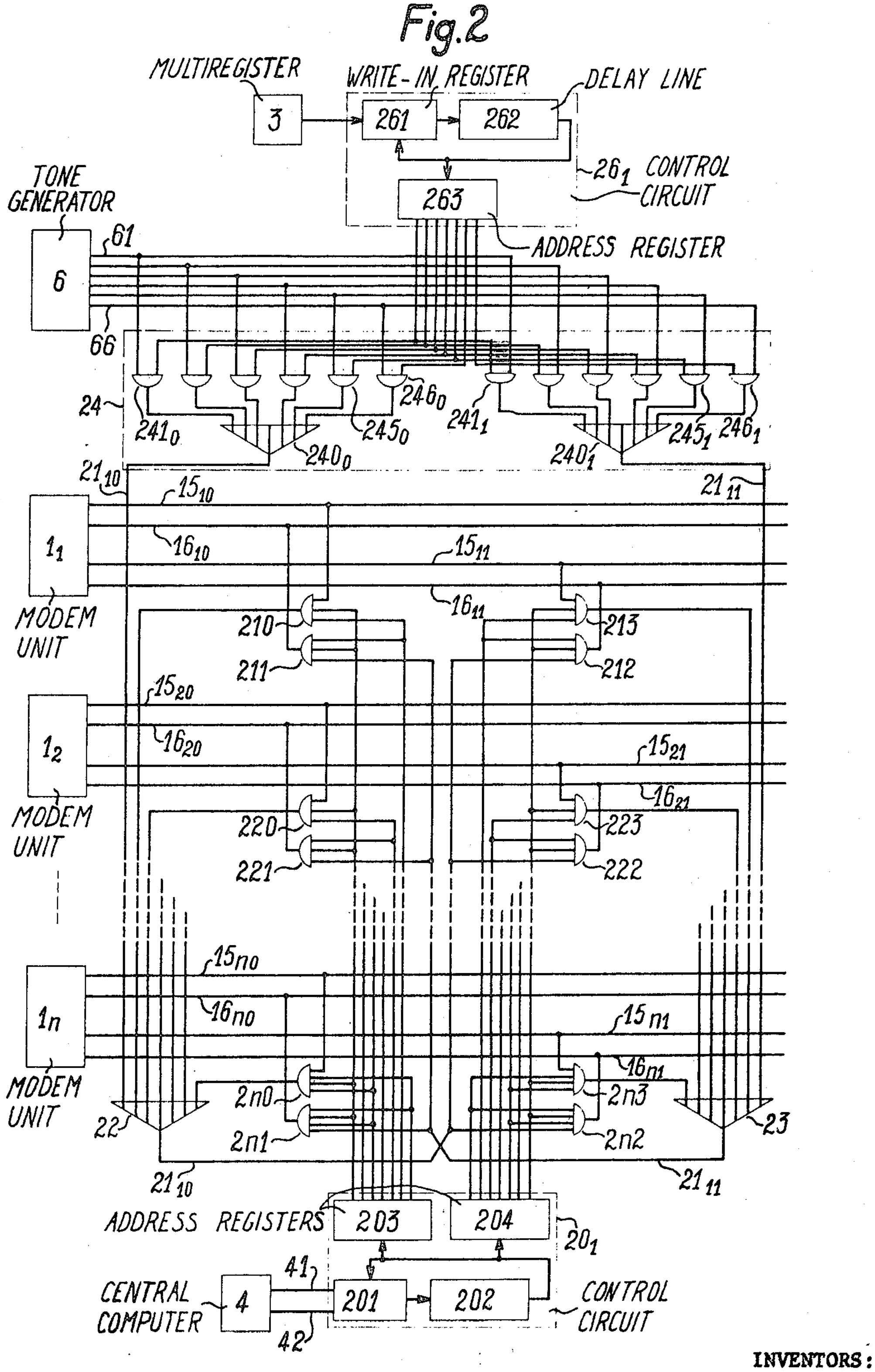
FIG. 2 is a partial detailed diagrammatic view showing the time division switching network of the switching system of the kind shown in FIG. 1.

FIG. 2 is a view in greater detail of an intermediate highway pair $20_{10}$, $20_{11}$ shown as an example. The other intermediate highway pairs differ from the pair $20_{10}$, $20_{11}$ only in the choice of the modem units to whose group highways they can be connected via cross points. The latter take the form of AND gates which are controlled in pairs via the control circuit $20_1$.

The even send group highways $15_{10}$, $15_{20}$. . . $15_{n0}$ are connected to the even intermediate highway $20_{10}$ via AND-gates 210, 220. . . 2n0 and an OR-gate 22. The odd intermediate highway $20_{11}$ is connected to the even receive group highways $16_{10}$, $16_{20}$. . . $16_{n0}$ by AND-gates 211, 221. . . 2n1. The two gates of each pair 210, 211 and 220, 221. . . 2n0 and 2n1 are actuated simultaneously.

Symmetrically, the odd send group highways $15_{11}$, $15_{21}$. . . $15_{n1}$ are connected to the odd intermediate highway $20_{11}$ by AND-gates 213, 223. . . 2n3 and an OR-gate 23, and the even intermediate highway $20_{10}$ is connected to the odd receive group highways $16_{11}$, $16_{21}$. . . $16_{n1}$ by AND-gates 212, 222 . . . 2n2. The two gates of each pair 213, 212, and 223, 222. . . and 2n3, 2n2 are actuated simultaneously.

The control circuit $20_1$ comprises a circulating store in the form of a delay line 202 looped on itself by way of a write-in and rewrite-in facility 201 connected by connections 41, 42 to the central computer 4. Such circulating stores are familiar in the PCM transmission art and are briefly described in the aforesaid U.S. Pat. No. 3,524,946.

The circulating store 201, 202 comprises words to the same number as there are time slots and has a cycle equal to the time slot repetition period or frame. Each word comprises eight bits, four of which denote the address of the gate pairs 210, 211 and 220, 221 . . . 2nO, 2n1 associated with even-index group highway pairs, as $15_{10}$, $16_{10}$, while the other four denote the address of the gate pairs 213, 212 and 223, 222. . . 2n3, 2n2 allotted to the odd-index group highway pairs, as $15_{11}$, $16_{11}$. The address bits delivered serially by the delay line 202 are registered and parallelled in a system comprising two registers 203, 204 whose outputs respectively control the gates for the even-index and odd-index group highways, decoding being performed in such registers. The addresses of the two gate pairs required for a connection which arrive serially from the computer 4 via the connection 41 during the time slot corresponding to the word into which such addresses are to be written, are introduced into the circulating store by the write-in and rewrite-in register 201, and the corresponding gates open at each cycle for the duration of this time slot. Via the connection 42, the computer 4 can collect data contained in the circulating store and, more particularly, become aware of free time slots on the intermediate highway pair $20_{10}$, $20_{11}$, a free time slot being characterized by the eight address bits being of zero value.

The exemplary scheme which is shown in FIG. 2 and in which the address registers 203, 204 each comprise seven outputs is a preferred embodiment in which 14 modem units, seven serving subscriber lines and seven serving interoffice trunks, can be interconnected by 14 pairs of intermediate highways. Accordingly, address register 203 serves 14 pairs of gates 210–211 to 2(14)0–2(14)1 (that is 2n0–2n1 in which *n* = 14) and address register 204 serves 14 pairs of gates 212–213 to 2(14)2–2(14)3. The address of a modem unit is expressed in a 2 out of 7 code and a modem unit serving subscriber's lines is distinguished from a modem unit serving interoffice trunks by an additional bit.

The cross points via which the various tone signals from the tone generator 6 can be applied to the intermediate highways $20_{10}$, $20_{11}$ form a system 24 which breaks down into two similar gate groups, one of which comprises six AND-gates $241_0$ to $246_0$ which connect the tone lines 61 to 66 respectively to the intermediate highway $21_{10}$ via an OR-gate $240_0$, while the other gate group comprises six AND-gates $241_1$ to $246_1$ connecting the tone lines 61–66 respectively to the intermediate highway $21_{11}$ via an OR-gate $240_1$. The system 24 is controlled by a control circuit $26_1$ which comprises a circulating store comprising a delay line 262 and a write-in and rewrite-in register 261 both identical to the same facilities of the control circuit $20_1$ but comprising only a single output register 263 whose bits 1–7, when equal to 1, open, in the case of the first five, the gate pairs $241_0$, $241_1$ to $245_0$, $245_1$ respectively, while the sixth bit opens the gate $246_0$ and the seventh bit opens the gate $246_1$, so that the five audible tones are applied in parallel to the two intermediate highways $21_{10}$, $21_{11}$ and the bell signal is applied to such highways separately. The binary signals denoting the tone to be transmitted are sent to the write-in and rewrite-in register 261 during the time slot corresponding to the word into which they are to be written, so that the required gates open in every cycle throughout such time slot.

Having now disclosed the general arrangement of the time division switching network of the invention, it is now possible to emphasize the difference between this arrangement and that of the prior art.

In a time division code modulation switching system PCM signals are conveyed on four-wire transmission lines. This is due to the fact that (i) amplifiers are inserted on the send, receive and intermediate group highways and that amplifiers have a direction of amplification and (ii) to the fact that the send group highways are connected to PCM coders while the receive group highways are connected to PCM decoders.

This is without inconvenience when a subscriber connected to a modem unit or concentrator unit (these two words are equivalent) is connected to a subscriber connected to another unit since between a PCM coder and a PCM decoder a four-wire path is completed through the send group highway of the first unit connected to the receive group highway of the second unit and the send group highway of the second unit connected to the receive group highway of the first unit.

Inconvenience begins when two subscribers connected to the same concentrator are to be connected therebetween since there is only a two-wire line for conveying the PCM signals. In such a case and in the prior art, the two subscribers cannot be given the same slot and in fact, the PCM signals of the two subscribers are transmitted in two successive slots.

Compared with the time division switching system of the prior art and as regards subscribers connected to the same modem or concentrator unit, the system of the invention can process two times the number of simultaneous communications if it is assumed that the time slots have the same duration in the two systems.

Figure 3:
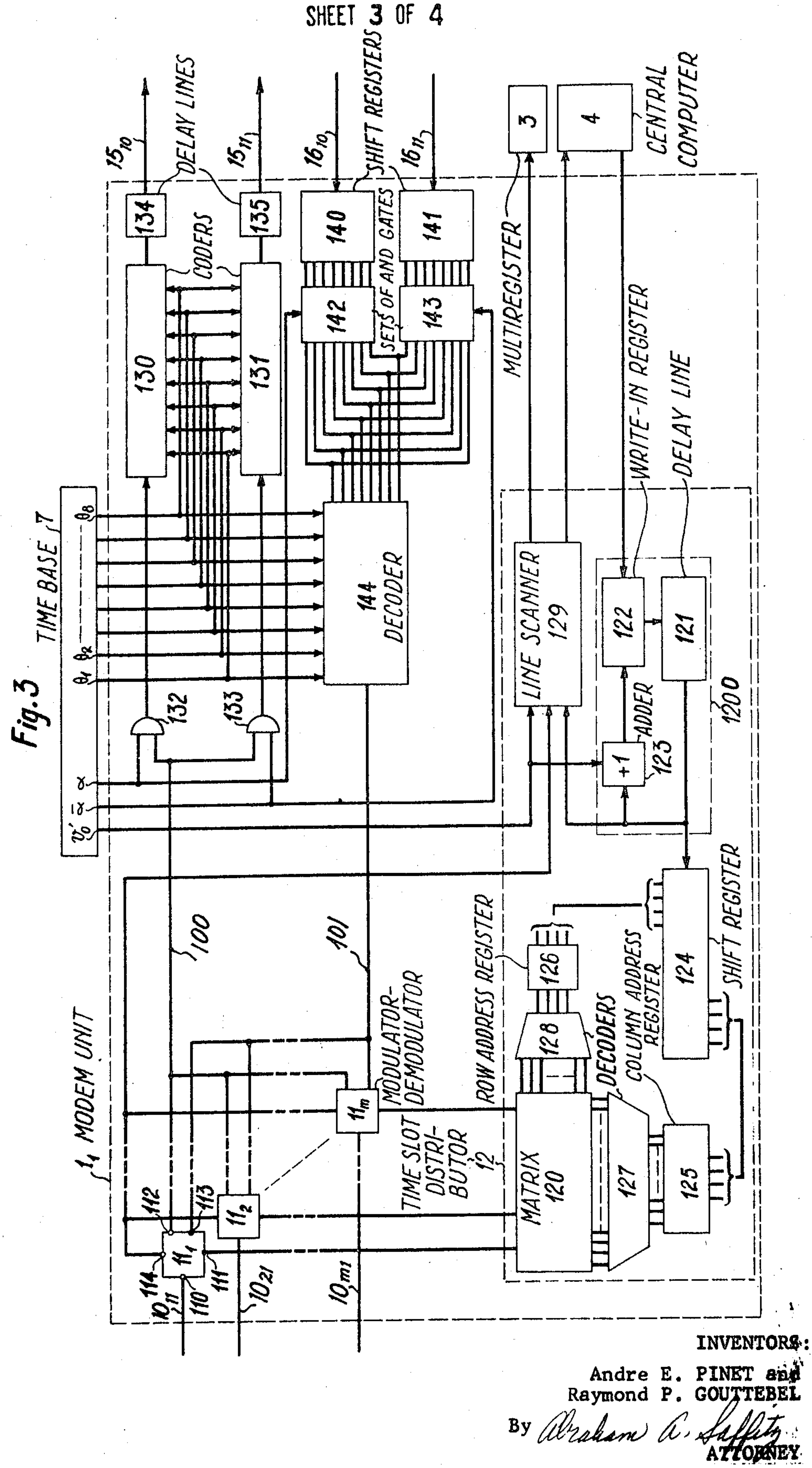
FIG. 3 is a diagram showing a modem unit of the system shown in FIG. 1.

FIG. 3 shows one possible form for any of the modem units associated with the switching network shown in FIGS. 1 and 2.

By way of example, the modulation unit $1_1$ is assumed to serve $m$ two-wire subscriber lines $10_{11}$ to $10_{m1}$, each of which is connected to a modulator-demodulator $11_1$ to $11_m$ also called "subscriber equipment" hereinafter and e.g., of the kind disclosed by U.S. Pat. No. 3,303,287 issued on Feb. 7, 1967 to Robert Mauduech, Raymond Gouttebel and Louis Proutiere. Each facility $11_1$ to $11_m$, is connected by a pair of terminals 110 to the two-wire subscriber line, as $10_{11}$, which it serves, and has an opening and test input terminal 111, a sample output 112, a sample input 113, and a test result output 114 at which a signal appears to indicate, in response to every pulse applied to the terminal 111, whether the subscriber's loop is open or closed.

The sample outputs 112 of all the facilities $11_1$ to $11_m$ are connected in parallel, through send concentration bus 100, to one or other of two identical coders 130, 131 via two AND-gates 132, 133 which are opened alternately by a square signal $\alpha$ delivered by the time base 7 and whose period is equal to the duration of a time slot $v$, the gate 132 being opened by the signal $\alpha$ during the first half $v'$ of each time slot, and the gate 133 being opened during the second half $v''$. The coders 130, 131 also receive code elements $\theta_1$ to $\theta_8$ from the time base 7 and provide a serial delivery of coded signals to the odd and even send group highways $15_{10}$, $15_{11}$ respectively, by way of delay lines 134, 135 serving to adjust the signals from the coders 130, 131, to the start of a particular time slot $v$.

The even and odd receive group highways $16_{10}$, $16_{11}$ are connected to the inputs of series-to-parallel shift registers 140, 141 respectively each having eight bits. The outputs of register 140 are connected to a set of AND-gates 142 which are opened by the signal $\alpha$ simultaneously with the gate 132—i.e., during the half slots $v'$. The outputs of register 141 are connected to a set of AND-gates 143 which are opened by the signal $\overline{\alpha}$ simultaneously with the gate 133—i.e., during the half slots $v''$. The corresponding outputs of the gate sets 142, 143 are connected in parallel to the inputs of a decoder 144 whose output is connected to the sample inputs of all the facilities $11_1$ to $11_m$, in parallel, through receive deconcentration bus 101.

The series-to-parallel conversion in the registers 140, 141 produces a time shift equal to the length of one time slot $v$ between the entry of a signal into such registers and the exit of the corresponding signal from the decoder 144. The half slot crossing effected by the switching network between the even and odd send and receive group highways is thus maintained.

The facilities $11_1$ to $11_m$ are controlled by a time slot distributor 12 comprising a matrix 120 having $m$ cross points individually connected to the test input of the $m$ facilities $11_1$ to $11_m$, a circulating store 1200, in the form of a delay line 121 looped on itself through a write-in and rewrite-in circuit 122 and an adder 123, a series-to-parallel shift register 124 whose series input is connected to the output of the delay line 121 and which has two sets of parallel outputs actuating a column address register 125 and a row address register 126 respectively connected to the columns and rows of the matrix 120 via decoders 127, 128.

The cycle of the circulating store 1200 is equal to the sampling period of the telephone signal and is divided into 2N words each occupying the first half $v'$ or the second half $v''$ of each time slot $v$. Each word comprises the number of bits required to denote each row and each column of the matrix 120. Each word is registered serially in the register 124 during the corresponding half slot $v'_j$ or $v''_j$ and transferred in parallel at the start of the next half slot $v''_j$ or $v'_k$ into the registers 125, 126, so far as the bits forming the column and row addresses of the particular matrix cross point to be opened are concerned.

The addresses of the subscriber equipments to be sampled are written into the circulating store 1200 by the central computer 4 via the write-in and rewrite-in circuit 122. Also, a first half slot of each sampling cycle, for instance $v'_0$, is reserved for systematic scanning of the subscriber equipments to discover those which are requesting service, and a second half slot of each sampling cycle, for instance $v''_0$, is used to test called subscriber lines to discover whether they are free or busy.

To scan the subscriber lines, the time base 7 delivers a signal corresponding to the first bit of the half slot $v'_0$ to the adder 123 so that the address written into this word increases by one unit at each cycle of the circulating store 1200. The subscriber equipment which thus receives a test pulse at its input 111 delivers a signal at its output 114 if the subscriber line which it serves is looped. The test outputs 114 of the subscriber equipments are connected in parallel to an input of a line scanner 129 which, upon receiving the latter signal, first investigates whether the address of the subscriber equipment from which such signal originates is written into a word of the circulating store 1200 other than the words $v'_0$. If such address is thus written in, the subscriber is making a call; if not, the scanner 129 informs the computer 4 that the subscriber whose address is written into the word $v'_0$ of the circulating store is calling.

To test a called subscriber, the computer 4 writes the address of the subscriber equipment into the word $v''_0$ of the circulating store 1200 via the write-in and rewrite-in circuit 122. In the absence of a response signal to the test signal transmitted during the slot $v'_1$, the scanner 129 checks whether the address is not already written into a word other that $v''_0$ of the circulating store. If such address is thus written in, the absence of response might be due to interruption of the loop due to the call subscriber dialing a directory number; otherwise, the scanner informs the computer 4 that the called line is free.

Also, the scanner 129 transmits loop interruptions of a calling subscriber line during dialing to the multiregister 3 which registers the number of the called subscriber.

Trunking via the switching network hereinbefore described between two subscribers A and B served by a single modem set of the kind shown in FIG. 3 or by two separate modem units proceeds in substantially the same way, for in both cases the communication is established by the use of time slots of equal rank on intermediate highways having different indices.

Consideration will first be given to the case in which the calling subscriber A and the called subscriber B are both served by the same modem unit, for instance, the set $1_1$, to which they are connected by lines $10_{11}$, $10_{21}$ respectively lending to subscriber equipments $11_1$, $11_2$. When a subscriber A offhooks and the address of his equipment $11_1$ is written by the adder 123 into the word $v'_0$ of the circulating store 1200, a test pulse is applied to the input terminal 111 of such equipment throughout the half slot $v''_0$ because of the time taken by the series-to-parallel conversion in the shift register 124. The response signal which then appears at terminal 114 of equipment $11_1$ is received by line scanner 129 which investigates whether the address of subscriber A is not written into some other word of the circulating store and which, if such address is absent, transmits to the computer 4 a call followed by the address of the calling subscriber A. The computer 4 then searches for a free time slot simultaneously on one of the group highway pairs $15_{10}$, $16_{11}$ or $15_{11}$, $16_{10}$ and on one of the intermediate highway pairs, as $21_{10}$, $21_{11}$, connected to such group highways. When such a time slot, for instance the slot $v_5$ of the group highway pair $15_{10}$, $16_{11}$ and of the intermediate highway pair $21_{10}$, $21_{11}$, is found to be free, one of the two half slots $v'_5$, $v''_5$ of the circulating store is thereby also available. During this available half slot, for instance, $v''_5$ the computer 4 introduces the address of the calling subscriber A into the write-in register 122 so that the modulator-demodulator $11_1$ of subscriber A is open during each half slot $v'_6$, the half slot shift being due to the series-to-parallel conversion in the shift register 124 of the coordinates of the corresponding cross point in the matrix 120. Also, the computer 4 causes the dialing tone to be transmitted to subscriber A via the receive group highway $16_{11}$ throughout each slot $v_5$. Therefore the computer 4 writes the address of the gates 210, 211 into the first four bits of the word $v_4$ of the circulating store 201–202 of the control circuit $20_1$ and simultaneously transmits to the multiregister 3 the data characteristic of the dialing phase of the call to be processed. The multiregister 3 writes into word $v_4$ of the circulating store 261–262 of control circuit $26_1$ the bit controlling the opening of the gates $241_0$, $241_1$ connecting the dialing tone output 61 to the intermediate highways $21_{10}$, $21_{11}$ respectively, so that such highways receive dialing tone throughout each slot $v_5$, until the line scanner 129 detects the first dialing signal, the slot shift being due to the series-to-parallel conversion in address register 263. Once the line scanner 129 informs the multiregister 3 of the start of dialing, multiregister 3 stops the dialing tone transmission instruction to the control circuit $26_1$ and registers the number of the subscriber B and transmits such number to the computer 4. The same checks that the called subscriber B is free. Accordingly, the computer 4 writes the address of the called subscriber B in the half slot $v''_0$ of the circulating store of the modem set to which the subscriber B is connected—the set $1_1$ in the case now being considered. Depending on the result of the test during the half slot $v'_1$, the line scanner 129 either instructs multiregister 3 to transmit the busy signal to the calling subscriber or informs the computer 4, after having checked that the address of the called subscriber B is not written into some other word in the circulating store 1200 as already described, that the called subscriber B is free. The computer 4 then checks that the slot $v_5$ is free on the second group highway pair $15_{11}$, $16_{10}$ of the modem unit $1_1$ and that the half slot $v'_6$ which comes immediately after the half slot $v''_5$ where the address of the subscriber A is written in is also available. If these conditions are not fulfilled, the computer 4 searches for another time slot which be simultaneously free on the two group highway pairs and on one intermediate highway pair. This fresh slot is allotted to the two subscribers and the data previously stored in the control circuit $20_1$ and in the circulating store 1200 are erased.

Figure 4:
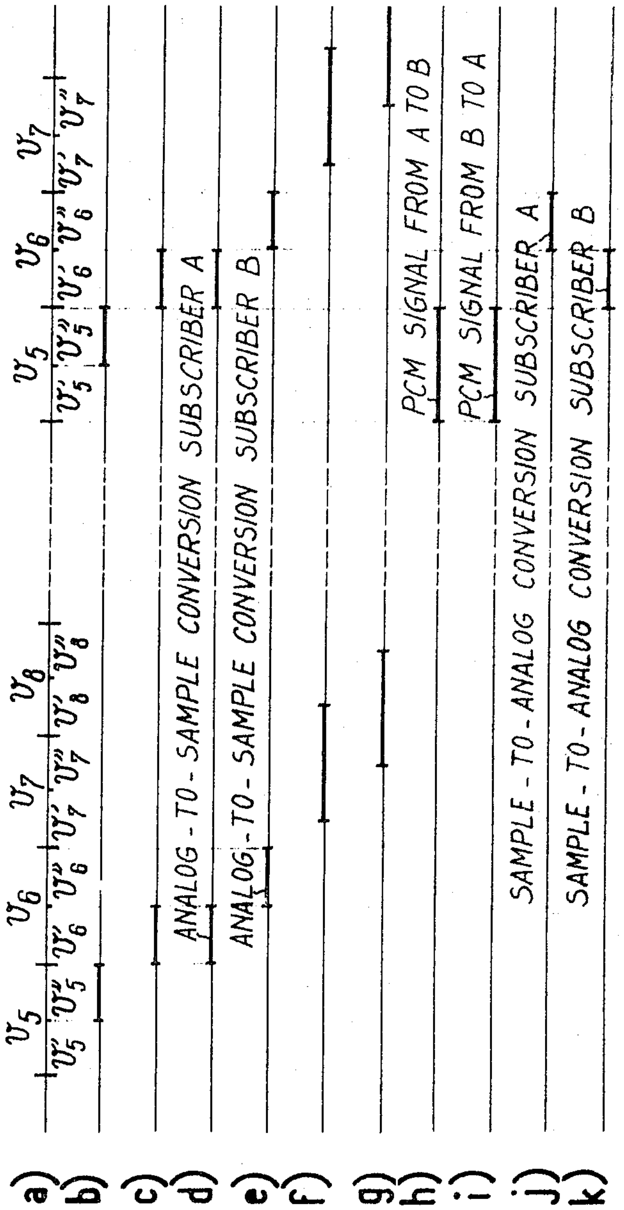
FIG. 4 is a timing diagram for a call between subscribers on a time division switching system of the kind shown in FIGS. 1–3.

If the time slots finally retained are e.g., the slot $v_5$ on the group highways and the half slots $v''_5$, $v'_6$ of the circulating store 1200 for the calling subscriber A and called subscriber B respectively, the computer 4 writes the address of subscriber B into the half slot $v'_6$ of the circulating store and writes the address of the gates 212, 213 into the word $v_4$ of the circulating store 201, 202. The multiregister 3 receives from the computer 4 data concerning the ringing phase of the required call. The multiregister 3 introduces into the word $v_4$ of the circulating store 261, 262 the bits controlling the transmission during each slot $v_5$ of the bell signal to the receive group highway $16_{11}$ via the gate $246_0$, intermediate highway $21_{10}$ and gate 212, and the ringing tone to the two intermediate highway, only the ringing tone which is addressed to the calling subscriber A via the gate 211 and the receive group highway $16_{11}$ being used. When the called subscriber B offhooks, these tones are interrupted and the call is effected in accordance with the timing diagram shown in FIG. 4 wherein:

The line (a) indicates the relative positions of the time slots used in the preceding example;

The lines (b) and (c) show the positions of the consecutive half slots $v''_5$, $v'_6$ of the circulating store 1200 in which the addresses of the subscribers A and B respectively are written;

The lines (d) and (e) show the half time slots $v'_6$, $v''_6$ for the respective analog-to-sample conversion of the analog signals coming from subscribers A and B;

The lines (f) and (g) show respectively the time positions of the PCM signals delivered by the coders 130, 131 in response to the amplitude-modulated samples applied to them during the half slots $v'6$ and $v''_6$;

The lines (h) and (i) show how the PCM coded signals from coders 130 and 131 are time shifted to the slot $v_5$ of the next cycle by the delay lines 134, 135, and The lines (j) and (k) show the half slots $v''_6$, $v'_6$ during which the analog signals resulting from the decoding of the PCM signals from A and B respectively are sampled and converted from sample to analog.

It is to be noticed that the signals from A are converted from analog to sample during half slot $v'_6$ and from sample to analog during half slot $v''_6$ while the signals from B are converted from analog to sample during half slot $v''_6$ and from sample to analog during half slot $v'_6$.

The sample taken from the telephone modulation of subscriber A during the half slot $v'_6$ is transmitted to the coder 130 via the gate 132, the same being opened by the signal $\alpha$ during the first half of each time slot.

The bits, of which there are for instance eight, corresponding to the sample are output by the coder 130 serially and uniformly distributed in a time interval equal to the duration of a time slot $v$, through the agency of clock pulses $\theta_1$ to $\theta_8$ delivered by the time base 7, but with a delay which depends upon the kind of coder used. This coded signal is transferred to the time slot $v_5$ of the next cycle by the delay line 134 and transmitted during such slot via the gates 210, 212 of the send group highway $15_{10}$ to the receive group highway $16_{11}$. Because of its series-to-parallel conversion in the shift register 141, such signal appears at the outputs thereof throughout the slot $v_6$, at the middle of which the signal $\overline{\alpha}$ opens the gate set 143 and transfers the signal to the decoder 144, at whose output the corresponding amplitude-modulated signal appears throughout the half slot $v''_6$—i.e., during the time that the modulator-demodulator $11_2$ of the subscriber B is open.

In the opposite direction, the sample taken from the modulator-demodulator $11_2$ during a half slot $v''_6$ is transmitted through the gate 133 to the coder 131. The coded signal delivered thereby is delayed until the start of the next slot $v_5$ by the delay line 135 which thus introduces a delay less by half a slot than the delay of the delay line 134, whereafter the coded signal goes through the gates 213, 211 of the send group highway $15_{11}$ to the receive group highway $16_{10}$. The signal, after series-to-parallel conversion in the shift register 140, appears at the output thereof from the start of the time slot $v_6$ and is immediately transferred, by the opening of the gates 142, to the decoder 144 which applies the corresponding amplitude-modulated signal to the incoming input 113 of the modulator-demodulator $11_1$ of the subscriber A during the half slot $v'_6$ when such set is open.

The foregoing explanations for interconnecting the two subscribers connected to the same modem unit can of course be transposed very readily to the case in which the subscriber lines or interoffice circuits to be interconnected depend upon separate modem units.

When either subscriber onhooks at the end of the communication, the time slot allotted to the call in the switching network must be released, as must also the half slots used in the modulators-demodulators serving the two subscribers, and to this end the data written into the corresponding words of the circulating stores of the control circuit of the intermediate highway pair used and of the circulating stores of the modem units must be erased. Since the computer 4 and the multiregister 3 are released when the called subscriber B offhooked, the space and time routing used must be restored from data delivered by the modem unit of whichever subscriber, e.g., the subscriber A, onhooked first, such data being the number of the modem unit of the subscriber A, the number of the group highway pair which be used, and the speech time slot. These data are transmitted to the computer 4 by the line scanner 129 of the modem unit of subscribers A and B when the test signal disappears form the output 114 of the modulator-demodulator $11_1$ of subscriber A. However, to ensure that such data are not transmitted at every loop interruption caused by subscriber's dialing, the transmission of such data is dependent upon the presence in the word of the corresponding circulating store of an extra bit which the computer 4 writes into the words, as $v''_5$, $v'_6$, allotted to each of the subscribers only when the call is set up.

From these data the computer 4 produces the number of the intermediate highway pair used and finds in the circulating store of the control circuit, at the word $v_4$ preceding the slot used, the data enabling it to rediscover the address of the modulator-demodulator to which the subscriber B is connected.

What we claim is:

1. A time division pulse code modulation switching system serving a plurality of subscriber and interoffice lines comprising:

a. modulation-demodulation units each including a plurality of analog to pulse amplitude modulation converters having inputs respectively connected to said lines and a plurality of associated pulse amplitude modulation to analog converters having outputs respectively connected to said lines, two pulse amplitude modulation to pulse code modulation converters, a send concentration bus connecting in parallel the outputs of the analog to pulse amplitude modulation converters to said pulse amplitude modulation to pulse code modulations converters, two pulse code modulation to pulse amplitude modulation converters, a receive deconcentration bus connecting in parallel said pulse code modulation to pulse amplitude modulation converters to the inputs of the pulse amplitude modulation to analog converters, b. a first and a second send group highway associated with each of said modulation-demodulation units and respectively connected to the pulse amplitude modulation to pulse code modulation converters thereof, a first and a second receive group highway associated with each of said modulation-demodulation units and respectively connected to the pulse code modulation to pulse amplitude modulation converters thereof, the first send and receive group highways of a given modulation-demodulation unit forming a first group highway pair and the second send and receive group highways of said given modulation-demodulation unit forming a second group highway pair, said group highway pairs forming two four-wire channels originating and terminating in said given modulation-demodulation unit, c. means for connecting during one and the same selected time slot, the send and receive group highways of a first group highway pair of an originating modulation-demodulation unit to respectively the receive and send group highways of a second group highway pair of a terminating modulation-demodulation unit, d. means for actuating the pulse amplitude modulation to pulse code modulation converter and the pulse code modulation to pulse amplitude modulation converter of the originating and terminating modulation-demodulation units during said selected time slot; and e. means for actuating the originating analog to pulse amplitude modulation converter and the terminating pulse amplitude modulation to analog converter respectively during one half and the other of said selected time slot.

2. A time division pulse code modulation switching system serving a plurality of subscriber and interoffice lines comprising:

a. modulation-demodulation units each including a plurality of analog to pulse amplitude modulation converters having inputs respectively connected to said lines and a plurality of associated pulse amplitude modulation to analog converters having outputs respectively connected to said lines, two pulse amplitude modulation to pulse code modulation converters, a send concentration bus connecting in parallel the outputs of the analog to pulse amplitude modulation converters to said pulse amplitude modulation to pulse code modulation converters, two pulse code modulation to pulse amplitude modulation converters, a receive deconcentration bus connecting in parallel said pulse code modulation to pulse amplitude modulation converters to the inputs of the pulse amplitude modulation to analog converters, b. a first and a second group highways associated with each of said modulation-demodulation units and respectively connected to the pulse amplitude modulation to pulse code modulation converters thereof, a first and a second receive group highways associated with each of said modulation-demodulation units and respectively connected to the pulse code modulation to pulse amplitude modulation converters thereof, the first send and receive group highways of a given modulation-demodulation unit forming a first group highway pair and the second send and receive group highways of said given modulation-demodulation unit forming a second group highway pair, said group highway pairs forming two four-wire channels originating and terminating in said given modulation-demodulation unit, c. pairs of intermediate highways and switchable cross point means for selectively connecting during one and the same selected time slot, the send and receive group highways of a first group highway pair of an originating modulation-demodulation unit to a pair of intermediate highways and the receive and send group highways of a second group highway pair of a terminating modulation-demodulation unit to the same pair of intermediate highways;

d. means for actuating the pulse amplitude modulation to pulse code modulation converter and the pulse code modulation to pulse amplitude modulation converter of the originating and terminating modulation-demodulation units during said selected time slot; and e. means for actuating the originating analog to pulse amplitude modulation converter and the terminating pulse amplitude modulation to analog converter respectively during one half and the other of said selected time slot.

* * * * *